United States Patent
Hirose et al.

(10) Patent No.: US 11,594,716 B2
(45) Date of Patent: Feb. 28, 2023

(54) NEGATIVE ELECTRODE ACTIVE MATERIAL, MIXED NEGATIVE ELECTRODE ACTIVE MATERIAL, AND METHOD OF PRODUCING NEGATIVE ELECTRODE ACTIVE MATERIAL

(71) Applicant: SHIN-ETSU CHEMICAL CO., LTD., Tokyo (JP)

(72) Inventors: Takakazu Hirose, Annaka (JP); Kohta Takahashi, Takasaki (JP); Takumi Matsuno, Annaka (JP); Reiko Sakai, Takasaki (JP); Yusuke Osawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 204 days.

(21) Appl. No.: 16/476,715

(22) PCT Filed: Jan. 19, 2018

(86) PCT No.: PCT/JP2018/001570
§ 371 (c)(1),
(2) Date: Jul. 9, 2019

(87) PCT Pub. No.: WO2018/168196
PCT Pub. Date: Sep. 20, 2018

(65) Prior Publication Data
US 2019/0355973 A1    Nov. 21, 2019

(30) Foreign Application Priority Data
Mar. 13, 2017 (JP) .............................. JP2017-047874

(51) Int. Cl.
*H01M 4/38* (2006.01)
*H01M 4/02* (2006.01)
(Continued)

(52) U.S. Cl.
CPC ........... *H01M 4/133* (2013.01); *H01M 4/134* (2013.01); *H01M 4/386* (2013.01); *H01M 4/583* (2013.01);
(Continued)

(58) Field of Classification Search
CPC ...... H01M 4/133; H01M 4/134; H01M 4/386; H01M 4/583; H01M 10/0525;
(Continued)

(56) References Cited

U.S. PATENT DOCUMENTS

| | | | |
|---|---|---|---|
| 5,395,711 A | 3/1995 | Tahara et al. | |
| 2003/0215711 A1* | 11/2003 | Aramata | H01M 4/485 429/218.1 |

(Continued)

FOREIGN PATENT DOCUMENTS

| | | |
|---|---|---|
| CN | 105932268 A | 9/2016 |
| EP | 2 088 221 A1 | 8/2009 |

(Continued)

OTHER PUBLICATIONS

Sep. 10, 2019 Japanese Office Action issued in Japanese Patent Application No. 2017-047874.

(Continued)

Primary Examiner — Christian Roldan
(74) Attorney, Agent, or Firm — Oliff PLC

(57) ABSTRACT

A negative electrode active material containing a negative electrode active material particle which includes a silicon compound particle containing a silicon compound ($SiO_x$: $0.5 \leq x \leq 1.6$). The silicon compound particle has three or more peaks in a chemical shift value ranging from −40 ppm to −120 ppm but has no peak in a chemical shift value within a range of −65±3 ppm in a spectrum obtained from $^{29}$Si-MAS-NMR of the silicon compound particle. This provides a negative electrode active material capable of improving (Continued)

$^{29}$Si chemical shift cycle characteristics when it is used as a negative electrode active material for a secondary battery.

8 Claims, 2 Drawing Sheets

(51) Int. Cl.
 H01M 4/48 (2010.01)
 H01M 4/62 (2006.01)
 H01M 4/36 (2006.01)
 H01M 4/133 (2010.01)
 H01M 4/134 (2010.01)
 H01M 4/583 (2010.01)
 H01M 10/0525 (2010.01)
(52) U.S. Cl.
 CPC .............. *H01M 10/0525* (2013.01); *H01M 2004/027* (2013.01)
(58) Field of Classification Search
 CPC ........... H01M 2004/027; H01M 4/364; H01M 4/483; H01M 2004/021; H01M 4/625; Y02E 60/10
 USPC ........................................................ 429/231
 See application file for complete search history.

(56) References Cited

U.S. PATENT DOCUMENTS

| | | |
|---|---|---|
| 2006/0083987 A1 | 4/2006 | Konishiike et al. |
| 2006/0099507 A1 | 5/2006 | Kogetsu et al. |
| 2008/0176137 A1 | 7/2008 | Endo et al. |
| 2009/0075173 A1 | 3/2009 | Jeong et al. |
| 2009/0202911 A1 | 8/2009 | Fukuoka et al. |
| 2014/0308588 A1 | 10/2014 | Hirakawa et al. |
| 2015/0221950 A1* | 8/2015 | Minami ............... H01M 4/5825 429/223 |
| 2015/0349337 A1 | 12/2015 | Sugiyama et al. |
| 2016/0233484 A1 | 8/2016 | Hirose et al. |
| 2016/0254537 A1 | 9/2016 | Kamo et al. |
| 2016/0336592 A1 | 11/2016 | Hirose et al. |
| 2017/0346066 A1 | 11/2017 | Sunano et al. |

FOREIGN PATENT DOCUMENTS

| | | |
|---|---|---|
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2009-259723 A | 11/2009 |
| JP | 2015-165482 A | 9/2015 |
| JP | 2015-167145 A | 9/2015 |
| JP | 2016-164870 A | 9/2016 |
| WO | 2015/025443 A1 | 2/2015 |
| WO | 2016/121324 A1 | 8/2016 |
| WO | 2016/203696 A1 | 12/2016 |

OTHER PUBLICATIONS

Sep. 17, 2019 International Preliminary Report on Patentability issued in International Patent Application No. PCT/JP2018/001570.
Apr. 24, 2018 International Search Report issued in International Patent Application No. PCT/JP2018/001570.
Gao Chunhui et al., "Superior Cycling Performance of SiOx/C Composite with Arrayed Mesoporous Architecture as Anode Material for Lithium-Ion Batteries", Jounral of the The Electrochemical Society, 2014, vol. 161, pp. A2216-A2221.
Nov. 20, 2020 Extended European Search Report issued in European Patent Application No. 18 767 552.5.
Oct. 2, 2020 Office Action issued in Japanese Patent Application No. 2020-700453.
Nov. 29, 2021 Office Action issued in Chinese Patent Application No. 201880017342.0.
Apr. 26, 2022 Search Report issued in Chinese Patent Application No. 2018800173420.
Liu Shuhe, et al., "Silicon/Carbon Composites Synthesized from Rice Husks and Their Lithium Storage Performance", Materials Reports, No. 22.

* cited by examiner

[FIG. 1]
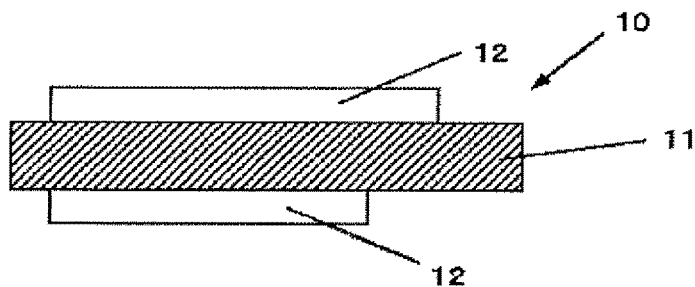
[FIG. 2]
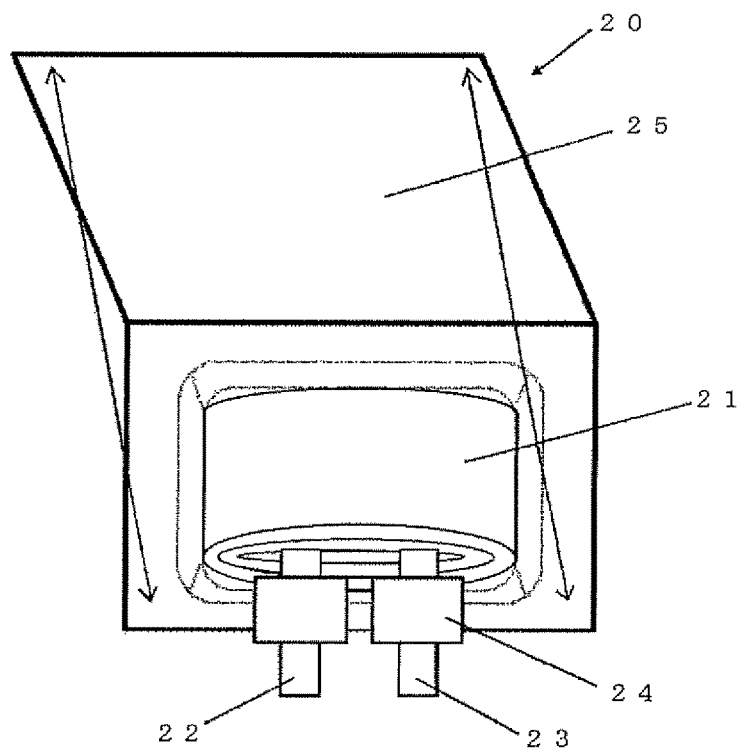
[FIG. 3]
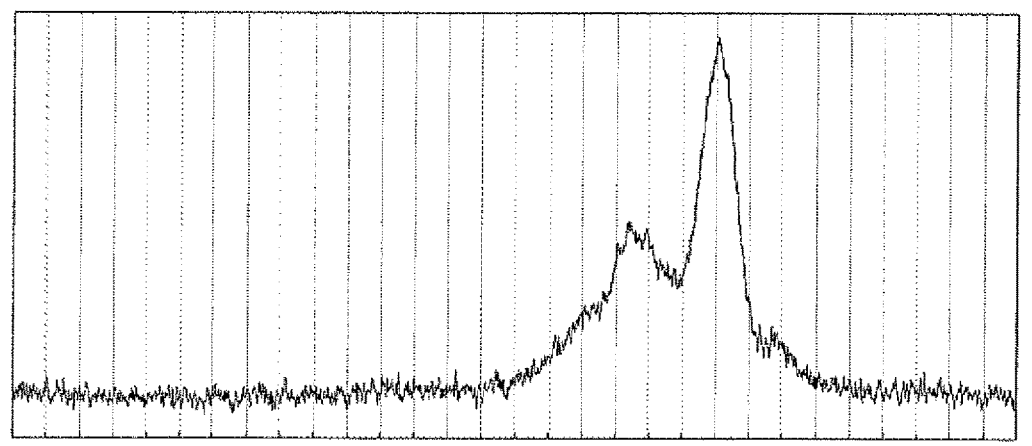
$^{29}$Si chemical shift

[FIG. 4]
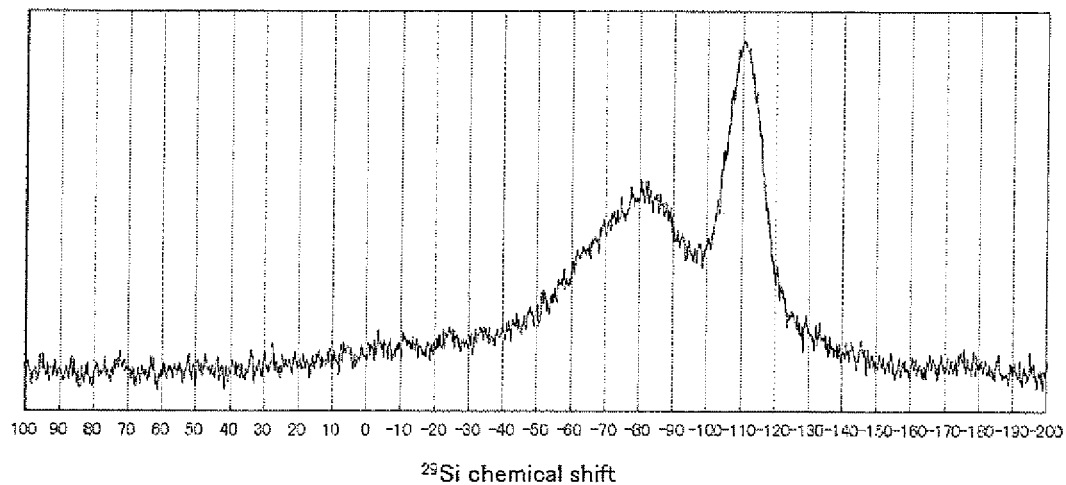
$^{29}$Si chemical shift
[FIG. 5]
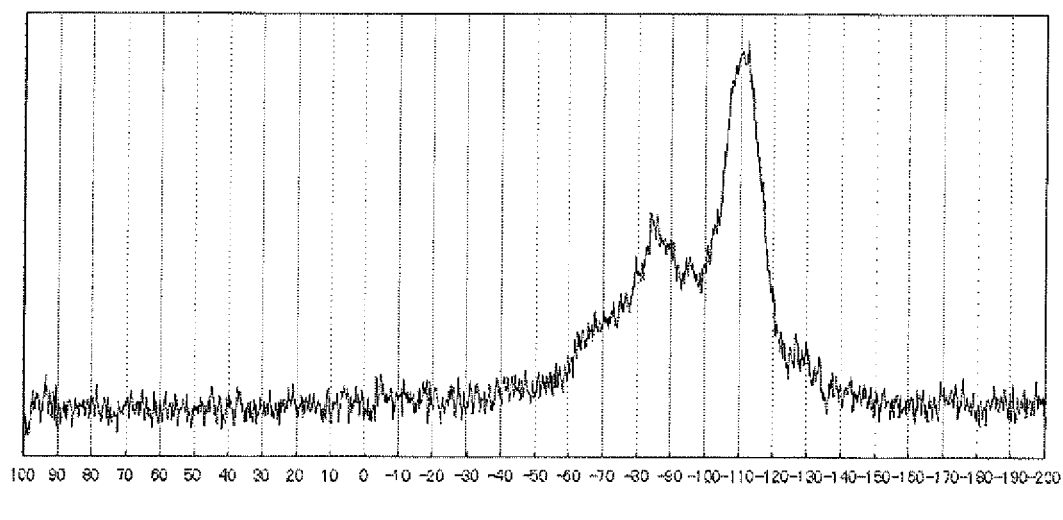
$^{29}$Si chemical shift

NEGATIVE ELECTRODE ACTIVE MATERIAL, MIXED NEGATIVE ELECTRODE ACTIVE MATERIAL, AND METHOD OF PRODUCING NEGATIVE ELECTRODE ACTIVE MATERIAL

TECHNICAL FIELD

The present invention relates to a negative electrode active material, a mixed negative electrode active material, and a method of producing a negative electrode active material.

BACKGROUND ART

In recent years, small electronic devices, represented by mobile terminals, have been widely used and urgently required to reduce the size and weight and to increase the life. Such market requirements have advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a logical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials and configurations of a negative electrode for a lithium-ion secondary battery mainly using a silicon material have been considered to improve the initial efficiency and the cycle characteristics of the battery.

More specifically, a vapor deposition method is used to accumulate silicon and amorphous silicon dioxide simultaneously so that better cycle characteristics and greater safety are achieved (see Patent Document 1, for example). Moreover, a carbon material (an electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \leq x \leq 1.5$, the range of particle size=1 μm to 50 μm) and a carbon material are mixed and calcined at a high temperature (see Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example). To improve the cycle characteristics, a hydrophobic layer such as a silane compound layer is formed on the surface of a silicon material (see Patent Document 9, for example). Moreover, a silicon oxide is used and coated with graphite coating to give electric conductivity so that improved cycle characteristics are achieved (see Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle characteristics (see Patent Document 11, for example). Moreover, a silicon oxide having a silicon-to-oxygen atomicity ratio of 1:y ($0 < y < 2$) is used to improve overcharge and overdischarge characteristics (see Patent Document 12, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369

Patent Document 8: Japanese Unexamined Patent publication (Kokai) No. 2008-177346

Patent Document 9: Japanese Unexamined Patent publication (Kokai) No. 2007-234255

Patent Document 10: Japanese Unexamined Patent publication (Kokai) No. 2009-212074

Patent Document 11: Japanese Unexamined Patent publication (Kokai) No. 2009-205950

Patent Document 12: Japanese Patent No. 2997741

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. In addition, the lithium ion secondary battery using a silicon material is desired to have cycle characteristics almost equivalent to those of a lithium ion secondary battery using a carbon-based active material. However, a negative electrode active material that exhibits a cycle stability equivalent to that of a lithium ion secondary battery using a carbon-based active material has not been proposed yet.

The present invention was accomplished in view of the above-described problems. It is an object of the present invention to provide a negative electrode active material that is capable of improving cycle characteristics when it is used as a negative electrode active material for a secondary battery; and a mixed negative electrode active material containing this negative electrode active material. Another object is to provide a method of producing the inventive negative electrode active material capable of improving cycle characteristics.

Solution to Problem

To achieve the object, the present invention provides a negative electrode active material containing a negative electrode active material particle;

the negative electrode active material particle comprising a silicon compound particle containing a silicon compound ($SiO_x$: $0.5 \le x \le 1.6$), wherein the silicon compound particle has three or more peaks in a chemical shift value ranging from −40 ppm to −120 ppm but has no peak in a chemical shift value within a range of −65±3 ppm in a spectrum obtained from $^{29}Si$-MAS-NMR of the silicon compound particle.

In the silicon compound particle from which the $^{29}Si$-MAS-NMR spectrum is obtained, the Si component contains so few Si regions with different crystallinity that Li ions are likely to diffuse uniformly. Accordingly, while a battery is being charged, for example, strain is hardly generated by the expansion behavior of the silicon compound particle due to Li ion insertion. Thus, the negative electrode active material particle is hard to break by the expansion, and hardly degrades even when the charging and discharging are repeated. As a result, the inventive negative electrode active material is capable of improving cycle characteristics when used as a negative electrode active material for a secondary battery.

In this case, the silicon compound particle preferably has a BET specific surface area in a range of 8 $m^2/g$ or less, and the silicon compound particle particularly preferably has a BET specific surface area in a range of 6.5 $m^2/g$ or less.

In the present invention, when the BET specific surface area of the silicon compound particle is in the range of 8 $m^2/g$ or less, the Si component in the silicon compound particle tends to have such a composition with amorphous Si existing in a lower ratio. Thus, the extent of the presence of the Si regions having different crystallinity in the Si component is further reduced, so that the negative electrode active material particle further hardly degrades. Accordingly, the inventive negative electrode active material as described above enables further improvement in cycle characteristics when used as a negative electrode active material for a secondary battery. Moreover, when the BET specific surface area of the silicon compound particle is in the range of 6.5 $m^2/g$ or less, the proportion covered by a binder is appropriate, so that the amount of the binder substantially covering the negative electrode active material particle becomes an appropriate amount. This makes it possible to suppress an increase in resistance due to the binder and improve the battery properties.

Moreover, the negative electrode active material particle preferably has a surface layer portion containing a carbon material.

When the surface layer portion of the negative electrode active material particle contains a carbon material as described above, the effect of improving electric conductivity is obtained.

Further, an average thickness of the carbon material is preferably 5 nm or more and 5000 nm or less.

When the carbon material has an average thickness of 5 nm or more, the effect of improving electric conductivity is more surely obtained. Moreover, when the carbon material for covering has an average thickness of 5000 nm or less, it is possible to more surely secure a sufficient amount of the silicon compound particle in the negative electrode active material particle, thereby further improving the battery capacity.

In addition, to achieve the above-described object, the present invention provides a mixed negative electrode active material comprising:

the negative electrode active material described above; and a carbon-based active material.

When the material for forming a negative electrode active material layer contains a carbon-based active material together with the inventive negative electrode active material (silicon-based negative electrode active material) as described above, it is possible to improve the electric conductivity of the negative electrode active material layer and to ease the expanding stress due to charging. The battery capacity is also successfully increased by mixing the silicon-based negative electrode active material and a carbon-based active material.

Moreover, to achieve the above-described object, the present invention provides a method of producing a negative electrode active material containing a negative electrode active material particle including a silicon compound particle, comprising the steps of:

preparing silicon compound particles each containing a silicon compound ($SiO_x$: $0.5 \le x \le 1.6$);

selecting, from the silicon compound particles, a silicon compound particle which has three or more peaks in a chemical shift value ranging from −40 ppm to −120 ppm but has no peak in a chemical shift value within a range of −65±3 ppm in a spectrum obtained by $^{29}$Si-MAS-NMR;

using the selected silicon compound particle to prepare a negative electrode active material particle; and using the prepared negative electrode active material particle to produce a negative electrode active material.

When the negative electrode active material particle as described above is used to produce a negative electrode active material, it is possible to produce a negative electrode active material having high capacity and favorable cycle characteristics when it is used as a negative electrode active material for a lithium ion secondary battery.

Advantageous Effects of Invention

The inventive negative electrode active material brings high capacity and favorable cycle characteristics when used as a negative electrode active material for a secondary battery. Moreover, the mixed negative electrode active material containing this negative electrode active material also brings the same effects. Further, the inventive method of producing a negative electrode active material makes it possible to produce a negative electrode active material having favorable cycle characteristics when it is used as a negative electrode active material for a lithium ion secondary battery.

BRIEF DESCRIPTION OF DRAWINGS

FIG. 1 is a sectional view showing an example of configuration of a negative electrode for a non-aqueous electrolyte secondary battery that contains the inventive negative electrode active material;

FIG. 2 is a view showing an example of configuration of a lithium secondary battery (laminate film type) that contains the inventive negative electrode active material;

FIG. 3 is a 29Si-MAS-NMR spectrum measured for a silicon compound particle of Example 1-1.

FIG. 4 is a 29Si-MAS-NMR spectrum measured for a silicon compound particle of Example 1-2; and FIG. 5 is a 29Si-MAS-NMR spectrum measured for a silicon compound particle of Comparative Example 1-1.

DESCRIPTION OF EMBODIMENTS

Hereinafter, embodiments of the present invention will be described, but the present invention is not limited thereto.

As described above, for increasing battery capacity of lithium ion secondary batteries, it has been investigated a method using a negative electrode mainly made from a silicon material as a negative electrode for a lithium ion secondary battery. However, there has not been proposed a negative electrode active material having cycle characteristics equivalent to those of a lithium-ion secondary battery using a carbon-based active material.

Accordingly, the inventors have diligently investigated to obtain a negative electrode active material for a secondary battery to give higher battery capacity and favorable cycle characteristics; thereby providing the present invention.

The inventive negative electrode active material contains a negative electrode active material particle. This negative electrode active material particle contains a silicon compound particle containing a silicon compound (SiO$_x$: 0.5≤x≤1.6). This silicon compound particle has three or more peaks in a chemical shift value ranging from −40 ppm to −120 ppm but has no peak in a chemical shift value within a range of −65±3 ppm in a spectrum obtained by $^{29}$Si-MAS-NMR. Note that, herein, the "peak" also includes a shoulder peak.

Such a negative electrode active material as in the present invention contains a negative electrode active material particle containing a silicon compound particle (also referred to as a silicon-based active material particle), and is capable of improving battery capacity thereby. Moreover, when the spectrum obtained from $^{29}$Si-MAS-NMR of the silicon compound particle is as described above, the Si component of the silicon compound particle contains few Si regions with different crystallinity, facilitating uniform diffusion of Li ions. Hence, while a battery is being charged, for example, strain is hardly generated by the expansion behavior of the silicon compound particle due to Li ion insertion. For example, in a case where both crystalline Si and amorphous Si are present considerably, since Li ions diffuse differently in the respective regions of crystalline Si and amorphous Si, strain is generated by the expansion behavior of the silicon compound particle, and the negative electrode active material particle is easy to break. On the other hand, in the present invention, there are few Si regions with different crystallinity as described above, so that negative electrode active material particle is hard to break by the expansion and hardly degrades even when the charging and discharging are repeated. As a result, the inventive negative electrode active material is capable of suppressing side reaction between the electrolyte of the battery and a new surface created on the negative electrode active material particle by the breakage, making it possible to improve the cycle characteristics when used as a negative electrode active material for a secondary battery. Additionally, since Li ions tend to diffuse uniformly in the silicon compound particle, the stability of OCV (open circuit voltage) of the battery is also improved.

In the inventive negative electrode active material, at least, a peak derived from a Si region which has a relatively ordered long-range order structure, but which does not reach crystalline state, appears around −70 ppm, a peak derived from a crystalline Si region appears around −80 ppm, and a peak derived from a SiO$_2$ region appears around −110 ppm in the chemical shift value ranging from −40 ppm to −120 ppm. Meanwhile, no peak appears in the chemical shift value within the range of −65±3 ppm. If a peak appears within the range of −65±3 ppm, it can be said that the silicon compound particle contains relatively a lot of Si regions which are highly amorphous, and which is thus mixed with crystalline Si to a large extent; hence, the presence of the Si regions with different crystallinity is noticeable.

<Negative Electrode for Non-Aqueous Electrolyte Secondary Battery>

Next, a negative electrode for a non-aqueous electrolyte secondary battery containing the inventive negative electrode active material will be described. FIG. 1 is a sectional view showing an example of configuration of a negative electrode for a non-aqueous electrolyte secondary battery (hereinafter, also referred to as a "negative electrode").

[Configuration of Negative Electrode]

As shown in FIG. 1, a negative electrode 10 is constituted to have a negative electrode active material layer 12 on a negative electrode current collector 11. This negative electrode active material layer 12 may be disposed on both sides or only one side of the negative electrode current collector 11. As long as the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when the negative electrode has an active material layer that expands in charging, the current collector containing the above elements has an effect of suppressing deformation of an electrode including the current collector. Each content of the contained elements is not particularly limited, but is preferably 100 ppm by mass or less. This is because a high effect of suppressing deformation is obtained. Such an effect of suppressing deformation can further improve the cycle characteristics.

The surface of the negative electrode current collector 11 may or may not be roughened. Examples of the roughened negative electrode current collector include a metallic foil subjected to an electrolyzing process, an embossing process, or a chemical etching process, and the like. Examples of the negative electrode current collector that is not roughened include a rolled metallic foil and the like.

[Negative Electrode Active Material Layer]

The negative electrode active material layer 12 contains the inventive negative electrode active material which is capable of occluding and releasing lithium ions. In view of battery design, other materials may be further contained, such as a negative electrode binding agent (binder) or a conductive assistant agent. The negative electrode active material contains a negative electrode active material particle, and the negative electrode active material particle contains a silicon compound particle containing a silicon compound ($SiO_x$: $0.5 \leq x \leq 1.6$).

The negative electrode active material layer 12 may contain a mixed negative electrode active material that contains the inventive negative electrode active material (silicon-based negative electrode active material) and a carbon-based active material. This makes it possible to decrease the electric resistance of the negative electrode active material layer and to ease the expanding stress due to charging. As the carbon-based active material, for example, pyrolytic carbons, cokes, glassy carbon fiber, baked organic polymer compounds, carbon black, and the like are usable.

In the mixed negative electrode active material, the mass ratio of the silicon-based negative electrode active material is preferably 6 mass % or more relative to the sum of masses of the inventive negative electrode active material (silicon-based negative electrode active material) and the carbon-based active material. When the mass ratio of the silicon-based negative electrode active material is 6 mass % or more relative to the sum of masses of the silicon-based negative electrode active material and the carbon-based active material, it is possible to surely improve the battery capacity.

As described above, the inventive negative electrode active material contains a silicon compound particle, and the silicon compound particle is a silicon oxide material containing a silicon compound ($SiO_x$: $0.5 \leq x \leq 1.6$), in which "x" is preferably close to 1 because higher cycle characteristics are successfully obtained. Incidentally, the composition of silicon compound in the present invention does not necessarily mean purity of 100%, and may contain a small quantity of impurity elements.

In this case, the silicon compound particle preferably has a BET specific surface area in a range of 8 $m^2/g$ or less, and the silicon compound particle particularly preferably has a BET specific surface area in a range of 6.5 $m^2/g$ or less. If the Si component contains more amorphous Si regions, the composition varies and the specific surface area tends to increase. In the present invention, when the silicon compound particle has a BET specific surface area in the range of 8 $m^2/g$ or less, it can be said that amorphous Si exists in a smaller ratio in the Si component in the silicon compound particle. Thus, the Si component contains less Si regions with different crystallinity, so that the negative electrode active material particle further hardly degrades. Accordingly, the inventive negative electrode active material as described above is capable of further improving cycle characteristics when used as a negative electrode active material for a secondary battery. Moreover, when the silicon compound particle has a BET specific surface area in the range of 6.5 $m^2/g$ or less, the proportion covered by a binder is appropriate, so that the amount of the binder substantially covering the negative electrode active material particle is appropriate. This makes it possible to suppress an increase in resistance due to the binder and improve the battery properties.

In the inventive negative electrode active material, the negative electrode active material particle preferably has a surface layer portion containing a carbon material. The negative electrode active material particle improves the electric conductivity by containing a carbon material in the surface layer portion. Accordingly, when the negative electrode active material containing the negative electrode active material particle like this is used as a negative electrode active material for a secondary battery, the battery properties are successfully improved.

The carbon material of the surface layer portion of the negative electrode active material particle preferably has an average thickness of 5 nm or more and 5000 nm or less. When the average thickness of the carbon material is 5 nm or more, the electric conductivity is improved. When the average thickness of the carbon material for covering is 5000 nm or less, it is possible to prevent lowering of the battery capacity in case of using a negative electrode active material containing a negative electrode active material particle like this as a negative electrode active material for a lithium ion secondary battery.

The average thickness of this carbon material can be calculated by the following procedure, for example. First, the negative electrode active material particles are observed through TEM (transmission electron microscope) at an optional magnification. This magnification is preferably a magnification by which the thickness of carbon material can be determined visually so as to measure the thickness. Subsequently, the thicknesses of carbon material are measured at 15 random points. In this case, it is preferable to set the measuring points as widely and randomly as possible without focusing a particular place. Lastly, the average value of the thicknesses of carbon material at the 15 points is calculated.

The BET specific surface area of the silicon compound particle is measured in a state where the silicon compound particle is not coated with the carbon material. This means that the silicon compound particle may be measured before the carbon coating, or the carbon material may be removed from the carbon-coated negative electrode active material particle to take out and then measure the silicon compound particle. The carbon material can be removed from the negative electrode active material particle by heating. For example, the carbon material can be removed by heating under air atmosphere at 600° C. for approximately 48 hours.

The covering rate of carbon material is not particularly limited, but is desirable to be as high as possible. The covering rate of 30% or more improves the electric conductivity further, and is preferable. The method for covering the carbon material is not particularly limited, but a method of carbonizing saccharide and a pyrolysis method of hydrocarbon gas are preferable since they can improve the covering rate.

The negative electrode active material particle preferably has a median diameter ($D_{50}$: the particle diameter when the accumulated volume becomes 50%) of 3 µm or more and 15 µm or less. When the median diameter is in the above range, lithium ions are easily occluded and released in charging and discharging, and the particle becomes less liable to break. When the median diameter is 3 µm or more, it is possible to decrease the surface area per mass to prevent increase of the irreversible battery capacity. On the other hand, when the median diameter is 15 µm or less, the particle becomes less liable to break, thereby being prevented from forming a new surface.

As the negative electrode binder contained in the negative electrode active material layer, any one or more of polymer material, synthetic rubber, and so on are usable, for example. Illustrative examples of the polymer material include polyvinylidene fluoride, polyimide, polyamideimide, aramid, polyacrylic acid, lithium polyacrylate, carboxymethyl cellulose, and the like. Illustrative examples of the synthetic rubber include styrene-butadiene rubber, fluororubber, ethylene-propylene-diene, and the like.

As the negative electrode conductive assistant agent, any one or more of a carbon material, such as carbon black, acetylene black, graphite, ketjen black, carbon nanotube, and carbon nanofiber are usable, for example.

The negative electrode active material layer is formed by an application method, for example. The application method is a method in which a negative electrode active material particle is mixed with the above binder and so on, optionally with a conductive assistant agent or a carbon material, and then dispersed to organic solvent, water, or the like so as to be applied.

[Method of Producing Negative Electrode]

A negative electrode can be produced by the following procedures, for example. First, a method of producing a negative electrode active material used for a negative electrode will be described. In the beginning, silicon compound particles each containing a silicon compound ($SiO_x$: $0.5 \leq x \leq 1.6$) are prepared. Next, from the prepared silicon compound particles, a silicon compound particle is selected which has three or more peaks in a chemical shift value ranging from −40 ppm to −120 ppm but has no peak in a chemical shift value within a range of −65±3 ppm in a spectrum obtained by $^{29}$Si-MAS-NMR. Then, the selected silicon compound particle is used to prepare a negative electrode active material particle, and the prepared negative electrode active material particle is used to produce a negative electrode active material.

More specifically, the negative electrode active material can be produced as follows. First, the silicon compound particle can be prepared by pulverizing, into particle, a deposit obtained by a vapor deposition method, for example. The vapor deposition method is a method including a step of heating a raw material which generates silicon oxide gas to generate silicon oxide gas, and a step of solidifying and depositing the generated silicon oxide gas on an adsorption plate. The $^{29}$Si-MAS-NMR spectrum of the silicon compound particle can be easily controlled with: the temperature and vacuum degree of a deposition chamber in a heating furnace for the vapor deposition method; a film formation rate of the silicon compound film onto the adsorption plate; and a vapor deposition distance, which is a distance between the raw material and the adsorption plate. The deposition chamber temperature needs to be changed in consideration of the film formation rate, radiant heat, the vacuum degree in the deposition chamber, the vapor deposition distance, and so forth. The silicon compound as in the present invention can be easily obtained by decreasing the film formation rate, radiant heat, and/or the vacuum degree, particularly when the deposition chamber temperature is lowered. In other words, conditions for obtaining the above NMR spectrum can be determined in advance. Note that each of the conditions such as deposition chamber temperature, vacuum degree, film formation rate, and vapor deposition distance necessary to obtain the silicon compound particle in the present invention as described above vary according to the apparatus structure of the heating furnace.

More specifically, the negative electrode active material can be produced as follows. First, a raw material which generates silicon oxide gas is heated in the presence of inert gas to generate silicon oxide gas. When considering the existence of oxygen on surface of the metallic silicon powder and slight oxygen in a reaction furnace, the mixing molar ratio in the raw material is desirably in a range of 0.8<metallic silicon powder/silicon dioxide powder <1.3.

The generated silicon oxide gas is solidified and deposited on an adsorption plate. Subsequently, the deposit of silicon oxide is taken out under the condition of the temperature in the reaction furnace of 100° C. or below, and then the deposit is ground and powdered using a ball mil, a jet mil, or the like. Thus obtained powder may be classified. In the present invention, the distribution of particle size of the silicon compound particle can be controlled in the pulverization step and the classification step. As described above, the silicon compound particle can be produced.

On the surface layer of the silicon compound particle, a carbon material layer may be formed. As a method to form the carbon material layer, a thermal decomposition CVD method is desirable. Hereinafter, an example of the method for forming a carbon material layer by thermal decomposition CVD method will be described.

First, silicon compound particles are set in a furnace. Then, a hydrocarbon gas is introduced into the furnace, and the temperature in the furnace is raised. The pyrolysis temperature is preferably, but not particularly limited to, 1200° C. or less, more preferably 950° C. or less. When the pyrolysis temperature is 1200° C. or less, it is possible to prevent unintentional disproportionation of the silicon compound particles. After raising the furnace temperature to a prescribed temperature, a carbon layer is formed onto the surface of the silicon compound particles. The hydrocarbon gas to be a raw material of the carbon material is not particularly limited, but preferably has a composition of $C_nH_m$ where $n \leq 3$. When $n \leq 3$, it is possible to decrease the production cost and to improve the properties of the decomposition products.

Next, from the silicon compound particles, a silicon compound particle is selected which has three or more peaks in the chemical shift value ranging from −40 ppm to −120 ppm but has no peak in the chemical shift value within the range of −65±3 ppm in the spectrum obtained by $^{29}$Si-MAS-NMR. In this selection step, the silicon compound particle in a state actually used as a negative electrode active material is subjected to $^{29}$Si-MAS-NMR measurement and selected given that the resulting spectrum satisfies the above-described conditions. When the negative electrode active material particle containing the silicon compound particle coated with the carbon material is used as a negative electrode active material, for example, the above-described thermal decomposition CVD method is performed, followed by the $^{29}$Si-MAS-NMR measurement. When the resulting spectrum satisfies the above-described conditions, the negative electrode active material particle containing this silicon compound particle is selected.

Note that the selection of silicon compound particle does not necessarily have to be performed every time the negative electrode active material is produced. Once production conditions are found for producing the silicon compound particle which has three or more peaks in the chemical shift value ranging from −40 ppm to −120 ppm but has no peak in the chemical shift value within the range of −65±3 ppm in the spectrum obtained by $^{29}$Si-MAS-NMR, the production conditions are selected, and thereafter the silicon compound particle can be produced under the same conditions as in the selected conditions.

The negative electrode active material produced as described above is mixed with other materials such as a negative electrode binder and a conductive assistant agent to form a negative-electrode mixture. Then, organic solvent, water, or the like is added thereto to form slurry. Subsequently, the slurry is applied onto the surface of a negative electrode collector and dried to form a negative electrode active material layer. In this case, heat pressing and so on may be performed in accordance with needs. As described above, a negative electrode is successfully produced.

<Lithium-Ion Secondary Battery>

Next, a lithium-ion secondary battery containing the inventive negative electrode active material will be described. Here exemplifies a lithium-ion secondary battery of a laminate film type as a concrete example.

[Configuration of Laminate Film Type Lithium-Ion Secondary Battery]

A laminate film type lithium-ion secondary battery 20 shown in FIG. 2 mainly includes a wound electrode body 21 stored in sheet-shaped outer parts 25. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 22 attached to the positive electrode and a negative-electrode lead 23 attached to the negative electrode. The outermost circumference of the electrode bodies is protected by a protecting tape.

The positive-electrode lead and the negative-electrode lead, for example, extend from the interior of the outer parts 25 toward the exterior in one direction. The positive-electrode lead 22 is made of, for example, a conductive material such as aluminum; the negative-electrode lead 23 is made of, for example, a conductive material such as nickel or copper.

An example of the outer part 25 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 21. The fusion-bond layer may be, for example, a film such as a polyethylene or polypropylene film; the metallic layer may be aluminum foil, for example; the protecting layer may be nylon, for example.

The space between the outer parts 25 and the positive and negative electrode leads is filled with close adhesion films 24 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains any one kind or two kinds or more of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM1O_2$ or $Li_yM2PO_4$, where M1 and M2 represent at least one kind of transition metal elements, and "x" and "y" each represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$), a lithium nickel complex oxide ($Li_xNiO_2$), and the like. Examples of the phosphate compound containing lithium and a transition metal element include a lithium iron phosphate compound ($LiFePO_4$), a lithium iron manganese phosphate compound ($LiFe_{1-u}Mn_uPO_4$ (0<u<1)), and the like. This is because higher battery capacity and excellent cycle characteristics are obtained using the positive electrode materials described above.

[Negative Electrode]

The negative electrode has a configuration which is similar to that of the above negative electrode 10 for a lithium ion secondary battery shown in FIG. 1, and, for example, has the negative electrode active material layers 12 disposed on both faces of the current collector 11. The negative electrode preferably has a negative-electrode charge capacity larger than electrical capacitance (a battery charge capacity) provided by the positive electrode active material, for this negative electrode itself can suppress the precipitation of lithium metal.

The positive electrode active material layer is formed partially on both faces of the positive electrode current collector. The negative electrode active material layer is also formed partially on both faces of the negative electrode current collector. In this case, the negative electrode active material layer provided on the negative electrode current collector, for example, has a region which does not correspond to a positive electrode active material layer to be faced. This intends to perform a stabilized battery design.

A non-facing area, that is, the above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films to give laminate structure. Examples of the synthetic resin include polytetrafluoroethylene, polypropylene, and polyethylene.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or combinations thereof is preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

For an alloyed negative electrode, the solvent particularly preferably contains at least one of halogenated chain carbonate ester and halogenated cyclic carbonate ester. Such a solvent enables the negative electrode active material to be coated with a stable coating at charging or discharging and particularly charging. The halogenated chain carbonate ester is chain carbonate ester having halogen as a constituent element (at least one hydrogen is substituted by halogen). And the halogenated cyclic carbonate ester is cyclic carbonate ester having halogen as a constituent element (that is, at least one hydrogen is substituted by halogen).

The kind of halogen is not particularly limited, but fluorine is preferable, for fluorine enables the formation of better coating than other halogens do. A larger number of halogens is better, for a more stable coating can be obtained which reduces a decomposition reaction of an electrolytic solution.

Examples of the halogenated chain carbonate ester include fluoromethyl methyl carbonate, difluoromethyl methyl carbonate, and the like. Examples of the halogenated cyclic carbonate ester include 4-fluoro-1,3-dioxolane-2-one, 4,5-difluoro-1,3-dioxolane-2-one, and the like.

The solvent preferably contains an unsaturated carbon bond cyclic carbonate ester as an additive, for this enables the formation of a stable coating on a negative electrode at charging and discharging and the suppression of a decomposition reaction of the electrolyte. Examples of the unsaturated carbon bond cyclic carbonate ester include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. An example of the acid anhydride includes propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably 0.5 mol/kg or more and 2.5 mol/kg or less. This content enables high ionic conductivity.

[Method of Producing Laminate Film Type Secondary Battery]

The present invention makes it possible to produce a negative electrode using a negative electrode active material produced by the inventive method of producing a negative electrode active material described above, and to produce a lithium-ion secondary battery using the produced negative electrode.

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10 for a lithium ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 1).

Then, an electrolytic solution is prepared. With ultrasonic welding or the like, the positive-electrode lead 22 is attached to the positive electrode current collector and the negative-electrode lead 23 is attached to the negative electrode current collector (see FIG. 2). Then, the positive and negative electrodes and the separator interposed therebetween are stacked or wound to produce the wound electrode body 21 and a protecting tape is stuck to the outermost circumference of the body. Next, the wound body is flattened. Subsequently, the film-shaped outer part 25 is folded in half to interpose the wound electrode body therebetween. The insulating portions of the outer part are stuck to one another by heat sealing, thereby the wound electrode body is encapsulated with one direction being opened. The close-adhesion films are inserted between the outer part and the positive- and negative-electrode leads. The prepared electrolytic solution is introduced from the opened side in a prescribed amount to perform the impregnation of the electrolytic solution under a vacuum. After the impregnation, the opened side is stuck by vacuum heat sealing. In this manner, the laminate film type lithium-ion secondary battery 20 is successfully produced.

EXAMPLE

Hereinafter, the present invention will be more specifically described by showing Examples of the present invention and Comparative Examples, but the present invention is not limited to these Examples.

Example 1-1

The laminate film type lithium ion secondary battery 20 shown in FIG. 2 was prepared by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide (lithium-nickel-cobalt-aluminum complex oxide: NCA) as a positive electrode active material, 2.5 mass % of a positive electrode conductive assistant agent, and 2.5 mass % of a positive electrode binder (polyvinylidene fluoride: PVDF). Then, the positive-electrode mixture was dispersed in an organic solvent (N-methyl-2-pyrrolidone: NMP) to form paste slurry. The slurry was subsequently applied to both surfaces of a positive electrode current collector with a coating apparatus having a die head and dried with a drying apparatus of hot-air type. The positive electrode current collector used here had a thickness of 15 μm. The resultant was finally compressed with a roll press.

Next, a negative electrode was produced. In the beginning, a negative electrode active material was produced by the following procedure. A mixed raw material of metallic silicon and silicon dioxide was introduced into a reaction furnace and evaporated with a deposition chamber temperature of 900° C. and a vacuum degree of 0.4 Pa to deposit the evaporated material on an adsorption plate such that the film formation rate was 20 g per hour. The deposit was sufficiently cooled and then taken out to pulverize the deposit with a ball mill. In thus obtained silicon compound particle, the value of "x" in $SiO_x$ was 1.0. Subsequently, the silicon compound particles were classified to adjust the particle sizes. Then, thermal decomposition CVD was performed to coat the surfaces of the silicon compound particles with carbon material. Thus, negative electrode active material particles (silicon-based negative electrode active material) were prepared.

Here, after the thermal decomposition CVD, the $^{29}$Si-MAS-NMR spectrum of the silicon compound particle in the negative electrode active material particles was measured. The measurement conditions were as follows. $^{29}$Si-MAS-NMR (magic angle spinning-Nuclear Magnetic Resonance)
  Apparatus: a 700-NMR spectroscope made by Bruker Corp.,
  Probe: a 4-mm-HR-MAS rotor, 50 μL,
  Sample Rotation Speed: 10 kHz,
  Temperature of Measurement Environment: 25° C.

FIG. 3 shows the measured $^{29}$Si-MAS-NMR spectrum. As shown in FIG. 3, in the $^{29}$Si-MAS-NMR spectrum of the silicon compound particle of Example 1-1, a peak derived from a Si region having a relatively ordered long-range order structure appeared at −70 ppm, a peak derived from a crystalline Si region appeared at −84 ppm, and a peak derived from a $SiO_2$ region appeared at −110 ppm. Note that the peak located at −70 ppm was a shoulder peak. Meanwhile, no peak appeared in the chemical shift value within the range of −65±3 ppm. Thus, the silicon compound particle of Example 1-1 had three peaks in the chemical shift value ranging from −40 ppm to −120 ppm.

Moreover, the silicon compound particle had a BET specific surface area of 3.2 $m^2/g$. Further, the negative electrode active material particle contained carbon material having an average thickness of 50 nm, and the particle size was 8 μm. Furthermore, the silicon compound had a diffraction peak attributable to Si(111) crystal face in an X-ray diffraction, the half value width (2θ) of which was 2.257°. Note that the size of the crystallite corresponding to the Si(111) crystal face was calculated according to the Scherrer equation based on the peak and was 3.77 nm. Nevertheless, the value of this crystallite size merely indicates a value mechanically determined by the Scherrer equation based on the peak, and does not mean that the entire Si region of the silicon compound particle is crystalline.

Next, the negative electrode active material particles for producing a negative electrode (silicon-based negative electrode active material) and a carbon-based active material were blended in a mass ratio of 1:9 to produce a negative electrode active material. The carbon-based active material used herein was a mixture in which artificial graphite and natural graphite coated with a pitch layer was mixed in a mass ratio of 5:5. The carbon-based active material had a median diameter of 20 μm.

Next, the produced negative electrode active material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form negative-electrode mixture slurry. Incidentally, the foregoing SBR and CMC were negative electrode binders (negative electrode binding agents).

As the negative electrode current collector, an electrolytic copper foil with a thickness of 15 μm was used. This electrolytic copper foil contained each 70 ppm by mass of carbon and sulfur. Finally, the negative electrode mixture slurry was applied onto the negative electrode current collector, and subjected to drying at 100° C. for 1 hour under a vacuum. The negative electrode active material layer had a deposited amount of 5 $mg/cm^2$ per unit area on a face of the negative electrode after drying (also referred to as an area density).

Subsequently, solvents (4-fluoro-1,3-dioxolane-2-one (FEC), ethylene carbonate (EC), and dimethyl carbonate (DMC)) were mixed, followed by dissolving electrolyte salt (lithium hexafluorophosphate ($LiPF_6$)) to prepare an electrolytic solution. In this case, the solvent composition was set to FEC:EC:DMC=10:20:70 in a volume ratio, and the content of the electrolyte salt was set to 1.2 mol/kg based on the solvent.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film (thickness: 12 μm) in which a film mainly composed of porous polyethylene was sandwiched by films mainly composed of porous polypropylene.

Then, the electrode body was put between outer parts, and then peripheries excluding one side are hot melted, and thereby the electrode body was stored in the outer parts. The outer part was an aluminum laminate film in which a nylon film, an aluminum foil, and a polypropylene film were laminated. Then, the prepared electrolytic solution was introduced from the open side to perform the impregnation under a vacuum. The open side was then stuck by heat sealing.

On the secondary battery thus produced, the cycle characteristics were evaluated.

The cycle characteristics were investigated in the following manner: First, two cycles of charging and discharging were performed at 0.2 C under an atmosphere of 25° C. to stabilize the battery and the discharge capacity in the second cycle was measured. Next, the cycle of charging and discharging was repeated until the total number of cycles reached 499 cycles and the discharge capacity was measured every cycle. Finally, a capacity retention rate (hereinafter, also referred to as cycle retention rate) was calculated by dividing the discharge capacity in the 500-th cycle, which was obtained by charging and discharging at 0.2 C, by the discharge capacity in the second cycle. In the normal cycle, that is, in the cycles from the third cycle to 499-th cycle, the charging and discharging were performed at 0.7 C in charging and 0.5 C at discharging.

Example 1-2

A secondary battery was produced as in Example 1-1 except that the deposition chamber temperature was 750° C., the vacuum degree was 0.3 Pa, and the film formation rate of the silicon compound film onto the adsorption plate was 15 g per hour. The cycle retention rate was calculated. In this manner, the crystallinity of the silicon compound particle of Example 1-2 was changed by changing the deposition chamber temperature, vacuum degree, and film formation rate, so that the shape of the $^{29}$Si-MAS-NMR spectrum was changed.

Here, FIG. 4 shows the $^{29}$Si-MAS-NMR spectrum of the silicon compound particle prepared in Example 1-2. In the $^{29}$Si-MAS-NMR spectrum of the silicon compound particle of Example 1-2, a peak derived from a Si region having long-range order structure appeared at −70 ppm, a peak derived from a crystalline Si region appeared at −80 ppm, and a peak derived from a $SiO_2$ region appeared at −110 ppm. Note that the peak located at −70 ppm was a shoulder peak. Meanwhile, no peak appeared in the chemical shift value within the range of −65±3 ppm. Thus, the silicon compound particle of Example 1-2 had three peaks in the chemical shift value ranging from −40 ppm to −120 ppm.

Comparative Example 1-1

A secondary battery was produced as in Example 1-1 except that the deposition chamber temperature was 500° C., the vacuum degree was 0.2 Pa, and the film formation rate of the silicon compound film onto the adsorption plate was 10 g per hour. The cycle retention rate was calculated.

Here, FIG. 5 shows the $^{29}$Si-MAS-NMR spectrum of the silicon compound particle prepared in Comparative Example 1-1. In the $^{29}$Si-MAS-NMR spectrum of the silicon compound particle of Comparative Example 1-1, a peak appeared within the range of −65±3 ppm.

Comparative Example 1-2

A secondary battery was produced as in Example 1-1 except that the deposition chamber temperature was 350° C., the vacuum degree was 0.8 Pa, and the film formation rate of the silicon compound film onto the adsorption plate was 5 g per hour. The cycle retention rate was calculated.

In the $^{29}$Si-MAS-NMR spectrum of the silicon compound particle of Comparative Example 1-2, a peak appeared within the range of −65±3 ppm. Moreover, a peak merely appeared at −110 ppm, and only two peaks appeared in the chemical shift value ranging from −40 ppm to −120 ppm.

Comparative Example 1-3

A secondary battery was produced as in Example 1-1 except that the deposition chamber temperature was 600° C., the vacuum degree was 0.3 Pa, and the film formation rate of the silicon compound film onto the adsorption plate was 15 g per hour. The cycle retention rate was calculated.

In the $^{29}$Si-MAS-NMR spectrum of the silicon compound particle of Comparative Example 1-3, no peak appeared within the range of −65±3 ppm. Moreover, peaks merely appeared at −84 ppm and −110 ppm, and only two peaks appeared in the chemical shift value ranging from −40 ppm to −120 ppm.

Table 1 shows the results of Examples 1-1, 1-2, and Comparative Examples 1-1 to 1-3.

TABLE 1

SiO$x$: x = 1, $D_{50}$ = 8 μm; graphite (natural graphite:artificial graphite = 5:5): $D_{50}$ = 20 μm; SiO$x$ ratio 10 mass %; carbon material: average thickness 50 nm; half value width 2.257°, crystallite 3.77 nm

|  | Number of peaks from −40 ppm to −120 ppm | Presence or absence of peak within −65 ± 3 ppm | Presence or absence of peak around −80 ppm | BET specific surface area (m$^2$/g) | Cycle retention rate (%) |
| --- | --- | --- | --- | --- | --- |
| Example 1-1 | 3 | absent | present (−84 ppm) | 3.2 | 72 |
| Example 1-2 | 3 | absent | present (−80 ppm) | 3.8 | 70 |
| Comparative Example 1-1 | 3 | present | present (−84 ppm) | 4.2 | 64 |
| Comparative Example 1-2 | 2 | present | absent | 5.3 | 48 |
| Comparative Example 1-3 | 2 | absent | absent | 4.8 | 55 |

As shown in Table 1, favorable cycle characteristics were achieved in Examples 1-1, 1-2; in each of the $^{29}$Si-MAS-NMR spectra of the silicon compound particles, three or more peaks appeared in the chemical shift value ranging from −40 ppm to −120 ppm, but no peak appeared in the chemical shift value within the range of −65±3 ppm. As in the spectrum shown in FIG. 3, Example 1-1 had a sharp peak derived from crystalline Si at −84 ppm, but had no peak within the range of −65±3 ppm. Accordingly, the crystalline Si is rarely mixed with amorphous Si, and the Li ion diffusion varies only to a small degree. Hence, the negative electrode active material particle hardly degraded and the cycle characteristics were favorable. In Example 1-2, the Si component of the silicon compound particle was rather amorphous as a whole as in the spectrum shown in FIG. 4 in comparison with Example 1-1. Like Example 1-2, even when a peak derived from crystalline Si appeared at −80 ppm and the bulk did not have clear crystallinity in comparison with Example 1-1 and contained an amorphous region, if no peak appeared within the range of −65±3 ppm, the crystalline Si was rarely mixed with the amorphous Si, and Li ions diffused with small variations. Thus, relatively good cycle characteristics were exhibited.

On the other hand, as in the spectrum shown in FIG. 5, Comparative Example 1-1 had a sharp peak at −84 ppm but had a peak within the range of −65±3 ppm, so that the amorphous Si region was broad. Hence, the crystalline Si was noticeably mixed with the amorphous Si, the negative electrode active material particle drastically degraded, and the cycle characteristics were lowered. Comparative Example 1-2 had peaks within the range of −65±3 ppm and at −110 ppm, and only two peaks appeared within the range of −40 ppm to −120 ppm. Thus, Comparative Example 1-2 contained relatively a lot of Si (zero valent, −65 ppm), which is present particularly on a lower magnetic field side. This Si has high reactivity with the electrolytic solution and is likely to cause degradation in the battery cycle evaluation. The cycle characteristics were actually lowered. In Comparative Example 1-3, no peak appeared within the range of −65±3 ppm, but peaks appeared only at the positions of −84 ppm and −110 ppm, so that only two peaks appeared within the range of −40 ppm to −120 ppm. Si (amorphous) on the low magnetic field side has the higher Li diffusivity than the high magnetic field side (crystalline). In Comparative Example 1-3, an amorphous portion was hardly detected, and the Li diffusivity was lowered, so that the cycle characteristics were lowered. As described above, among the three peaks within the range of −40 ppm to −120 ppm, if a peak appears in a region close to the amorphous portion, it can be utilized as Si having good Li diffusivity. Nevertheless, if the peak is shifted too much on the low magnetic field side, the high reactivity with the electrolytic solution lowers the battery properties. Meanwhile, crystalline Si has poor Li diffusivity and tends to decrease the battery properties. As a compromising point, having a relatively amorphous peak (shoulder) on a higher magnetic field side than −65 ppm and a peak at crystalline −84 ppm enables the charging and discharging while securing the Li diffusivity to some extent.

Examples 2-1 and 2-2, Comparative Examples 2-1, 2-2

Secondary batteries were produced as in Example 1-1 except for adjusting the oxygen amount in the bulk of the silicon compound. In this event, the oxygen amount was adjusted by changing the heating temperature or the ratio of metallic silicon and silicon dioxide in the raw material of the silicon compound. Each "x" value of the silicon compound shown by $SiO_x$ in Examples 2-1, 2-2 and Comparative Examples 2-1, 2-2 is shown in Table 2.

TABLE 2

$SiOx$ $D_{50}$ = 8 μm; graphite (natural graphite:artificial graphite = 5:5): $D_{50}$ = 20 μm; SiOx ratio 10 mass %; carbon material: average thickness 50 nm; half value width 2.257°, crystallite 3.77 nm

|  | x | Cycle retention rate (%) |
|---|---|---|
| Comparative Example 2-1 | 0.3 | 59 |
| Example 2-1 | 0.5 | 70 |
| Example 1-1 | 1 | 72 |
| Example 2-2 | 1.6 | 71 |
| Comparative Example 2-2 | 1.8 | — |

As shown in Table 2, when the value of "x" in the silicon compound shown by SiOx was out of the range of 0.5≤x≤1.6, the battery properties were lowered. For example, when oxygen was insufficient (x=0.3) as shown in Comparative Example 2-1, the capacity retention rate was seriously lowered. On the other hand, as shown in Comparative Example 2-2, larger oxygen amount (x=1.8) decreased the electric conductivity and failed to substantially exhibit the capacity of the silicon oxide, and the evaluation had to be stopped thereby.

Examples 3-1 to 3-6

Secondary batteries were produced as in Example 1-1 except that the values of the BET specific surface areas of the silicon compound particles were as shown in Table 3. The cycle retention rates were calculated. The BET specific surface areas of the silicon compound particles were controlled by adjusting the deposition chamber temperature, vacuum degree, and film formation rate.

In Example 3-1, the deposition chamber temperature was 800° C., the vacuum degree was 0.6 Pa, and the film formation rate was 20 g/hour.

In Example 3-2, the deposition chamber temperature was 750° C., the vacuum degree was 0.1 Pa, and the film formation rate was 15 g/hour.

In Example 3-3, the deposition chamber temperature was 700° C., the vacuum degree was 0.1 Pa or less, and the film formation rate was 13 g/hour.

In Example 3-4, the deposition chamber temperature was 650° C., the vacuum degree was 0.1 Pa or less, and the film formation rate was 12 g/hour.

In Example 3-5, the deposition chamber temperature was 600° C., the vacuum degree was 0.1 Pa or less, and the film formation rate was 10 g/hour.

In Example 3-6, the deposition chamber temperature was 550° C., the vacuum degree was 0.1 Pa or less, and the film formation rate was 10 g/hour.

TABLE 3

SiOx: x = 1, $D_{50}$ = 8 μm; graphite (natural graphite:artificial graphite = 5:5): $D_{50}$ = 20 μm; SiOx ratio 10 mass %; carbon material: average thickness 50 nm; half value width 2.257°, crystallite 3.77 nm; the number of peaks in the range of −40 ppm to −120 ppm: 3, peak within −65 ± 3 ppm: absent

|  | BET specific surface area (m²/g) | Cycle retention rate (%) |
|---|---|---|
| Example 1-1 | 3.2 | 72 |
| Example 3-1 | 5.5 | 71 |

TABLE 3-continued

SiO$x$: $x = 1$, D$_{50}$ = 8 μm; graphite (natural graphite:artificial graphite = 5:5): D$_{50}$ = 20 μm; SiO$x$ ratio 10 mass %; carbon material: average thickness 50 nm; half value width 2.257°, crystallite 3.77 nm; the number of peaks in the range of −40 ppm to −120 ppm: 3, peak within −65 ± 3 ppm: absent

|  | BET specific surface area (m²/g) | Cycle retention rate (%) |
|---|---|---|
| Example 3-2 | 6.5 | 70 |
| Example 3-3 | 7.3 | 69 |
| Example 3-4 | 8.0 | 67 |
| Example 3-5 | 8.5 | 64 |
| Example 3-6 | 9.0 | 63 |

In the silicon compound particles of Examples 1-1, 3-1 to 3-4 in which the BET specific surface area was 8 m²/g or less, the amorphous Si region was narrower than those in Examples 3-5, 3-6 in which the BET specific surface area exceeded 8 m²/g. Thus, in Examples 1-1, 3-1 to 3-4, the cycle characteristics were further improved in comparison with Examples 3-5, 3-6. Additionally, in Examples 1-1, 3-1, 3-2 in which the BET specific surface area was 6.5 m²/g or less, the cycle characteristics were particularly improved.

Examples 4-1 to 4-5

Secondary batteries were prepared under the same conditions as in Example 1-1 except for changing the average thickness of the carbon material covering the surface of the silicon-based active material particle as shown in Table 4. The cycle characteristics were evaluated. The average thickness of the carbon material can be adjusted by changing the CVD conditions. Note that even when the covering with the carbon material was not performed, the heat treatment itself was conducted with the same temperature profile as in Example 1-1 to match the conditions.

TABLE 4

SiO$x$: $x = 1$, D$_{50}$ = 8 μm; graphite (natural graphite:artificial graphite = 5:5): D$_{50}$ = 20 μm; SiO$x$ ratio 10 mass %; half value width 2.257°, crystallite 3.77 nm; the number of peaks in the range of −40 ppm to −120 ppm: 3, peak within −65 ± 3 ppm: absent

|  | Average thickness (nm) | Cycle retention rate (%) |
|---|---|---|
| Example 4-1 | no covering | 66 |
| Example 4-2 | 5 | 69 |
| Example 4-3 | 10 | 70 |
| Example 1-1 | 50 | 72 |
| Example 4-4 | 1000 | 75 |
| Example 4-5 | 5000 | 76 |

As can be seen from Table 4, when the carbon layer had a film thickness of 5 nm or more, the electric conductivity was more surely improved, and the cycle retention rate was successfully improved thereby. On the other hand, when the carbon layer had a film thickness of 5000 nm or less, the amount of silicon compound particles was secured sufficiently in battery design, and did not decrease the battery capacity thereby.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A negative electrode active material containing a negative electrode active material particle that has a surface layer portion containing a carbon material;
the negative electrode active material particle comprising a silicon compound particle containing a silicon compound (SiO$_x$: 0.5≤x≤1.6),
wherein:
the silicon compound particle has three or more peaks in a chemical shift value ranging from −40 ppm to −120 ppm but has no peak in a chemical shift value within a range of −65±3 ppm in a spectrum obtained from $^{29}$Si-MAS-NMR of the silicon compound particle, and
the silicon compound particle has a BET specific surface area that is in a range of 8 m²/g or less.

2. The negative electrode active material according to claim 1, wherein the silicon compound particle has a BET specific surface area that is in a range of 6.5 m²/g or less.

3. The negative electrode active material according to claim 1, wherein an average thickness of the carbon material is 5 nm or more and 5000 nm or less.

4. A mixed negative electrode active material comprising:
the negative electrode active material according to claim 1; and
a carbon-based active material.

5. A mixed negative electrode active material comprising:
the negative electrode active material according to claim 2; and
a carbon-based active material.

6. A mixed negative electrode active material comprising:
the negative electrode active material according to claim 3; and
a carbon-based active material.

7. A method of producing a negative electrode active material containing a negative electrode active material particle including a silicon compound particle, comprising the steps of:
preparing silicon compound particles each containing a silicon compound (SiO$_x$: 0.5≤x≤1.6);
selecting, from the silicon compound particles, a silicon compound particle which has three or more peaks in a chemical shift value ranging from −40 ppm to −120 ppm but has no peak in a chemical shift value within a range of −65±3 ppm in a spectrum obtained by $^{29}$Si-MAS-NMR;
using the selected silicon compound particle to prepare a negative electrode active material particle; and
using the prepared negative electrode active material particle to produce a negative electrode active material.

8. The negative electrode active material according to claim 1, wherein the silicon compound particle has a BET specific surface area that is in a range of 3.2 m²/g or more and 8 m²/g or less.

* * * * *